(12) United States Patent
Zhan et al.

(10) Patent No.: US 9,285,639 B2
(45) Date of Patent: Mar. 15, 2016

(54) SLIT ELECTRODE, ARRAY SUBSTRATE AND DISPLAY DEVICE

(71) Applicants: Boe Technology Group Co., Ltd., Beijing (CN); HEFEI Boe Optoelectronics Technology Co., Ltd., Anhui (CN)

(72) Inventors: Yujuan Zhan, Beijing (CN); Park Ku Hyun, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 50 days.

(21) Appl. No.: 14/081,793

(22) Filed: Nov. 15, 2013

(65) Prior Publication Data

US 2014/0139797 A1 May 22, 2014

(30) Foreign Application Priority Data

Nov. 20, 2012 (CN) .......................... 2012 1 0473050

(51) Int. Cl.
*G02F 1/1343* (2006.01)
*G02F 1/1337* (2006.01)

(52) U.S. Cl.
CPC .... *G02F 1/134363* (2013.01); *G02F 1/133707* (2013.01); *G02F 2001/134318* (2013.01); *G02F 2001/134372* (2013.01); *G02F 2201/40* (2013.01)

(58) Field of Classification Search
CPC .............. G02F 1/134363; G02F 2001/134318; G02F 2001/134372

USPC .......................... 349/144, 141, 139, 136, 129
See application file for complete search history.

(56) References Cited

U.S. PATENT DOCUMENTS 5,477,351 A * 12/1995 Takahara ............... G02F 1/1334
349/201
2005/0105032 A1* 5/2005 Ono et al. ..................... 349/139
(Continued)

FOREIGN PATENT DOCUMENTS

CN          101042506 A    9/2007
CN          101281311 A    10/2008
(Continued)

OTHER PUBLICATIONS

English translation of Office Action dated Sep. 29, 2014, received for corresponding Chinese Patent Application No. 2012104730502.
English Translation of second Office Action dated Dec. 18, 2014 for corresponding Chinese Application No. 201210473050.2.
(Continued)

*Primary Examiner* — Sang V Nguyen
(74) *Attorney, Agent, or Firm* — Kinney & Lange, P.A.

(57) ABSTRACT

A slit electrode, an array substrate and a display device are provided to improve the brightness uniformity of the display image and reduce the color shift, thereby improving the image quality. The slit electrode comprises at least one slit electrode unit including a plurality of first groups of slits arranged in a first direction and a plurality of second groups of slits arranged in a second direction, wherein each of the first groups of slits include at least one first slit arranged in the first direction, and each of the second groups of slits include at least one second slit arranged in the second direction, and wherein the first and the second groups of slits are arranged alternately.

6 Claims, 8 Drawing Sheets

(56) References Cited

U.S. PATENT DOCUMENTS

| | | | |
|---|---|---|---|
| 2007/0153196 A1* | 7/2007 | Jang et al. | 349/141 |
| 2007/0258026 A1* | 11/2007 | Sumi | 349/106 |
| 2008/0002071 A1* | 1/2008 | Park | 349/33 |
| 2008/0117374 A1* | 5/2008 | Iwamoto | 349/143 |
| 2009/0109386 A1* | 4/2009 | Chen et al. | 349/123 |
| 2009/0268134 A1* | 10/2009 | Lee | G02F 1/136286 349/110 |
| 2010/0014012 A1* | 1/2010 | Irie et al. | 349/39 |
| 2011/0261295 A1* | 10/2011 | Kim | G02F 1/133707 349/96 |

FOREIGN PATENT DOCUMENTS

| | | |
|---|---|---|
| CN | 202886794 U2 | 4/2013 |
| JP | 2010002674 A | 1/2010 |
| JP | 2010008693 A | 1/2010 |
| KR | 20050023084 A | 3/2005 |

OTHER PUBLICATIONS

English Translation of third Office Action dated Apr. 28, 2015 for corresponding Chinese Application No. 201210473050.2.

* cited by examiner

SLIT ELECTRODE, ARRAY SUBSTRATE AND DISPLAY DEVICE

CROSS-REFERENCE TO RELATED APPLICATION

This application claims the benefit of Chinese Patent Application No. 201210473050.2 filed on Nov. 20, 2012 in the State Intellectual Property Office of China, the whole disclosure of which is incorporated herein by reference.

BACKGROUND OF THE INVENTION

1. Field of the Invention

Embodiments of the present invention relate to a display technique field, more particularly, relate to a slit electrode, an array substrate having the same and a display device.

2. Description of the Related Art

An ADS mode is a core technology of a wide visual angle of a plane electrical field, and the core technical feature is described as follows: a multidimensional electrical field is formed by an electrical field generated by an edge of slit electrodes and an electrical field generated between slit electrode layers and plate-shaped electrode layers in the same plane, so that all the orientations of liquid crystal molecules located between the slit electrodes and over the electrodes in a liquid crystal layer can be rotated, thereby improving an operating efficiency of the liquid crystal molecules and increasing a transmission efficiency. A switching technique of the ADS mode may improve image quality of the TFT-LCD, and has advantages of high resolution, high transmittance, low power consumption, wide visual angle, high aperture ratio, low chromatic aberration, without push Mura and the like.

Figure 1:
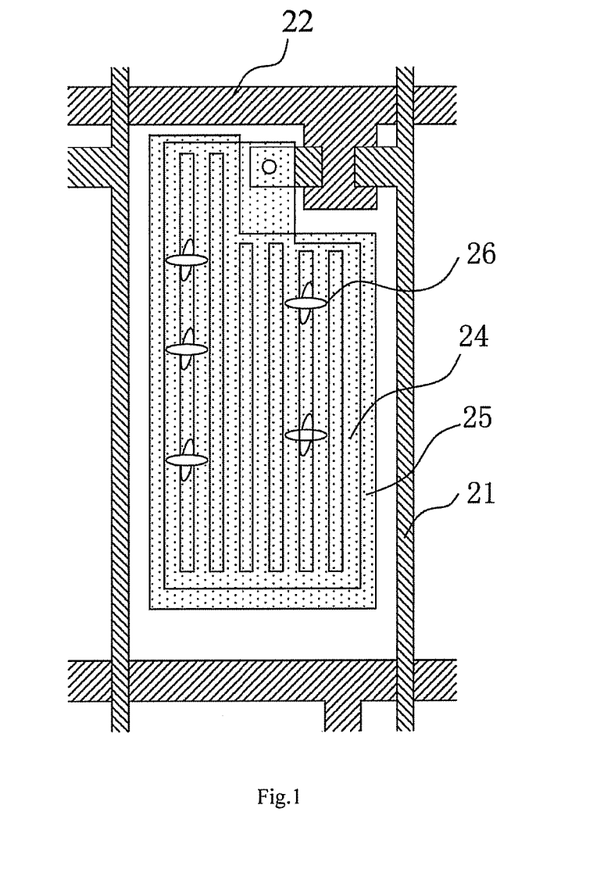
FIG. 1 is a top view showing a single domain pixel structure of an array substrate of an existing ADS mode.

As shown in FIG. 1, an array substrate of an existing ADS mode is formed with gate lines 22 and data lines 21 thereon. Sub pixel regions (i.e., a R sub pixel region, a G sub pixel region or a B sub pixel region) are defined by the gate lines 22 and the data lines 21 being adjacent with each other, and each of the sub pixel regions is formed with a thin film transistor (TFT), a strip common electrode 24 and a plurality of pixel electrodes 25 therein. An insulating layer (not shown in the top view) is between the common electrode 24 and the pixel electrode 25. When a voltage is not applied, there is no electrical field generated between the common electrode 24 and the pixel electrode 25, and the liquid crystal molecules 26 located between the array substrate and a color film substrate will not be deflected. When the voltage is applied, a horizontal electrical field is generated between the common electrode 24 and the pixel electrode 25, and the liquid crystal molecules 26 will be deflected in a direction of the electrical field. In the case of a wide visual angle, high transmittance is achieved.

Figure 2:
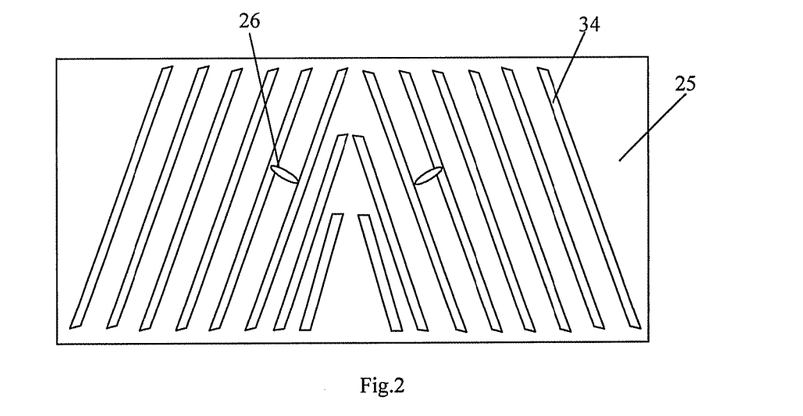
FIG. 2 is a top view showing electrodes of a dual-domain pixel structure of an array substrate of an existing ADS mode.

As shown in FIG. 2, the array substrate of the existing ADS mode usually adopts a dual-domain pixel structure of a "/ \" shape, i.e., a plurality of common electrodes 34 which are mirror-symmetrical is of "/ \" shaped. When the voltage is applied, the liquid crystal molecules will have symmetrical orientations, and a display visual angle may exhibit a uniform symmetry at a particular angle. However, when rotating a screen or viewing the screen from different angle, the display visual angle are not uniformly symmetrical (for example, there are relatively large differences between the visual angles in 0°, 90°, 180° and 270° directions and the visual angles in 45°, 135°, 225° and 315° directions) because apparent lengths of the liquid crystal molecules are different, thus display performance is deteriorated.

A display array substrate of the liquid crystal molecules having the above horizontal frication arrangement mode may easily occur a display defect that contrast of pictures in a horizontal direction is not uniform, which causes a deteriorated display quality. In addition, due to the horizontal arrangement of the liquid crystal molecules, a color shift may be generated easily at a visual angle, thereby affecting image display performance.

SUMMARY OF THE INVENTION

It is an object of the present invention to provide a slit electrode, an array substrate and a display device to improve the brightness uniformity of the display image and reduce the color shift of the display image, thereby improving the image quality.

According to an aspect of the present invention, there is provided a slit electrode comprising at least one slit electrode unit including a plurality of first groups of slits arranged in a first direction and a plurality of second groups of slits arranged in a second direction, wherein each of the first groups of slits include at least one first slit arranged in the first direction, and each of the second groups of slits include at least one second slit arranged in the second direction, and wherein the first and the second groups of slits are arranged alternately.

According to another aspect of the present invention, there is provided an array substrate comprising the slit electrode described in the above embodiment.

According to a further aspect of the present invention, there is provided a display device comprising the array substrate described in the above embodiment.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

The general concept of various exemplary embodiments of the present invention is to provide a slit electrode, an array substrate and a display device to improve the brightness uniformity of the display image and reduce the image color shift, thereby improving the image quality.

Embodiments of the present invention are used for a display screen having wide visual angle, such as ADS display mode, wherein a pixel electrode or a common electrode is set as an electrode slit. The slit electrode comprises at least one slit electrode unit including a plurality of first groups of slits arranged along a first direction and a plurality of second groups of slits arranged along a second direction, which is different from the first direction. Each of the first groups of slits include at least one first slit arranged along the first direction, and each of the second groups of slits include at least one second slit arranged along the second direction. The first and the second groups of slits are arranged alternately. By arranging the slits in different directions, it is possible to change a pattern of the slit electrodes, so that the liquid crystal molecules of a pixel region in a horizontal direction are apt to be arranged in a plurality of orientations, thereby improving the brightness uniformity of image and reducing the color shift.

It should be noted that the positions of the common electrode and the pixel electrode can be interchanged. The common electrode may be arranged above the pixel electrode, or the pixel electrode may be arranged above the common electrode. The upper electrode should be set as a slit electrode, and the lower electrode should either be set as a slit electrode or a plate-like electrode. Next, the slit electrode will be described by various embodiments of the present invention with reference to the accompanying drawings.

Examples that the slit electrode is used as the pixel electrode and the plate-like electrode is used as the common electrode are described herein.

Figure 3:
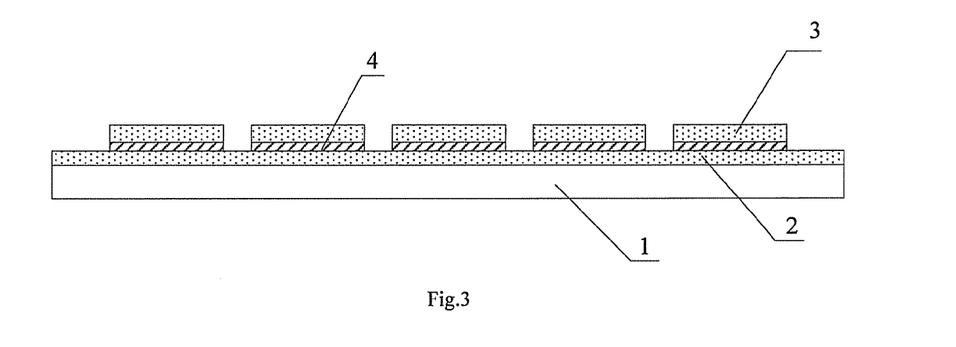
FIG. 3 is a schematic cross section view showing an array substrate of an exemplary embodiment in accordance with the present invention.

An overall structure of the pixel electrode on the array substrate is firstly described Referring to FIG. 3, an array substrate in accordance with an exemplary embodiment of the present invention comprises a substrate 1, a common electrode 2 and a plurality of pixel electrodes 3 arranged on the substrate 1, and the common electrode 2 and the pixel electrodes 3 are insulated by an insulating layer 4 with each other. The common electrode 2 is provided below the pixel electrodes 3, and is closer to one side of the substrate 1. The array substrate shown in FIG. 3 is an array substrate having the ADS mode.

In the above array substrate, the substrate 1 may be made of glass, plastic, and it is preferable to be made of the glass. The insulating layer 4 may comprise at least one layer. The array substrate shown in FIG. 3 is for illustrative purpose only, as long as an insulation effect can be achieved, and is not intended to limit to the present invention. Materials and manufacturing processes of the common electrode 2 and the pixel electrodes 3 are the same as those in the prior art, and the detailed description thereof are omitted herein.

Figure 4:
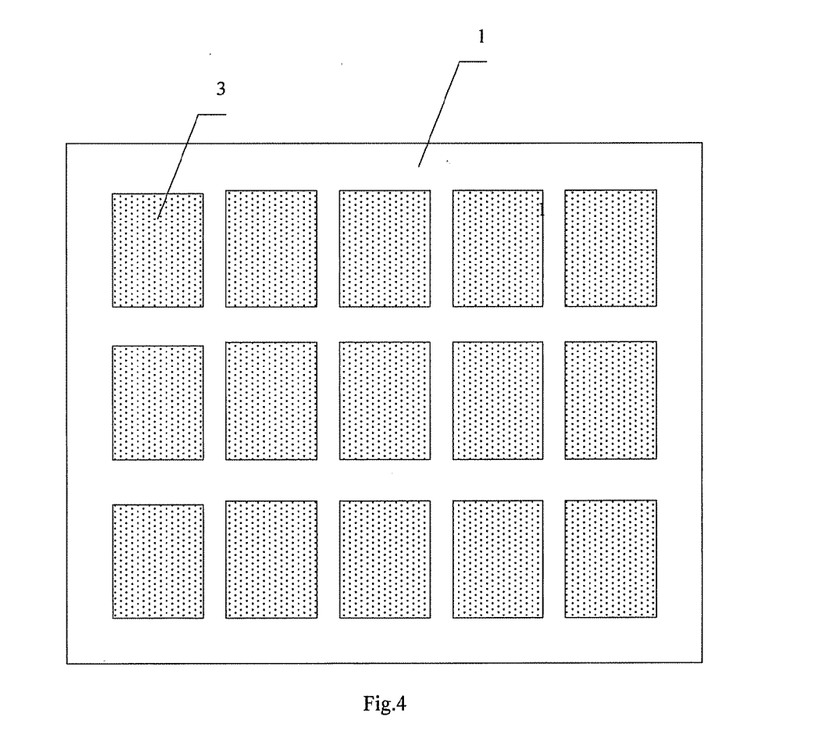
FIG. 4 is a schematic top view showing the array substrate of the exemplary embodiment in accordance with the present invention.

FIG. 4 is a top view of the array substrate in accordance with an exemplary embodiment of the preset invention. The pixel electrodes 3 are arranged as a matrix form on the substrate 1 in a horizontal direction and a longitudinal direction. An arrangement mode of slits of the pixel electrodes 3 is not shown in FIG. 4.

An arrangement mode of the slits is described in details in the case where slit electrodes in accordance with exemplary embodiments of the present invention are used as the pixel electrodes. The pixel electrodes include at least one slit electrode unit. Now the structures of the slit electrodes of various embodiments are described in details.

Figure 5:
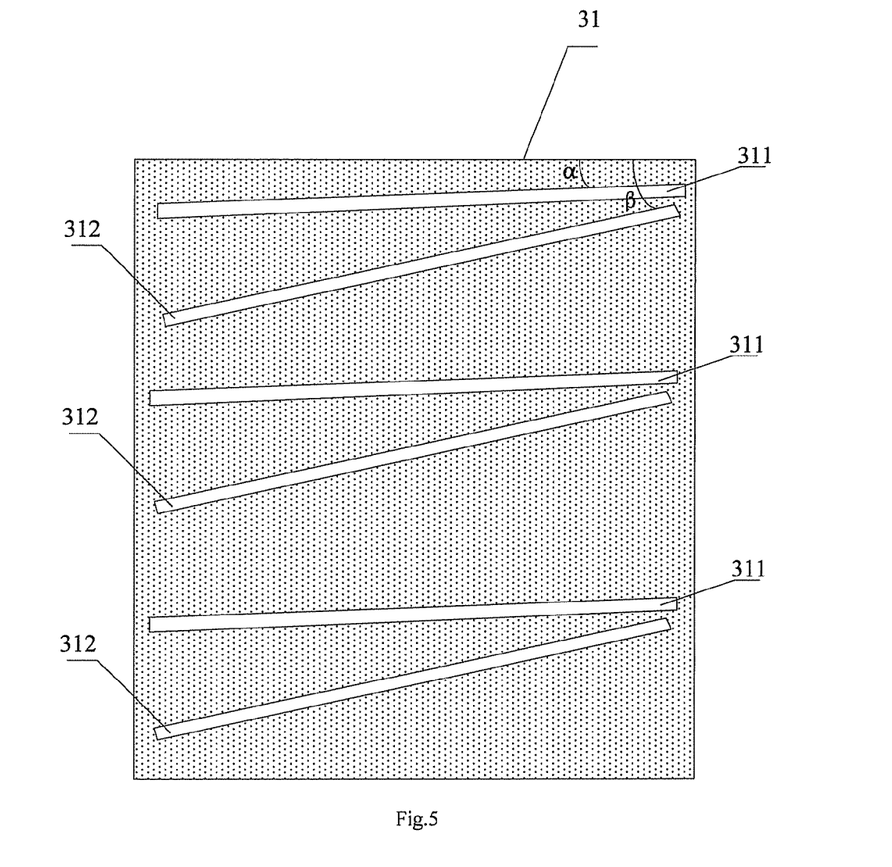
FIG. 5 is a structure diagram showing a slit electrode unit in which a first slit group and a second slit group both include one slit according to a first exemplary embodiment.

As shown in FIG. 5, a slit electrode unit 31 of a first exemplary embodiment includes a plurality of first groups of slits 311 arranged in a first direction, and a plurality of second groups of slits 312 arranged in a second direction. The first groups of slits 311 are arranged in the first direction, and an angel defined by the first direction and a short side of the pixel electrodes is α. The second groups of slits 312 are arranged in the second direction, and an angel defined by the second direction and the short side of the pixel electrodes is β.

The first slit groups 311 includes at least one first slit arranged in the first direction. Each of the second groups of slits 312 includes at least one second slit arranged in the second direction. The first group of slits 311 and the second group of slits 312 are arranged alternatively in a direction parallel to a long side of the pixel electrodes.

In FIG. 5, each of the first groups of slits 311 include one first slit arranged in the first direction, and each of the second groups of slits 312 include one second slits arranged in the second direction.

It should be noted that the number of the slits in the first groups of slits 311 may be the same as or different from that of the slits in the second groups of slits 312.

Figure 6:
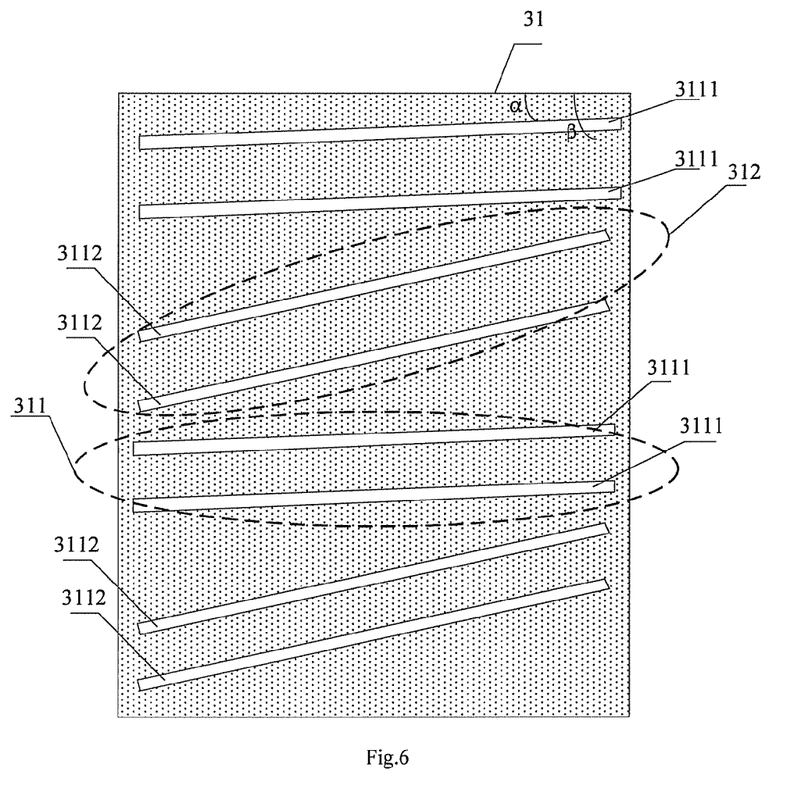
FIG. 6 is a structure diagram showing a slit electrode unit in which a first slit group and a second slit group both include two slits according to a second exemplary embodiment.

For example, in a slit electrode unit 31 shown in FIG. 6 in accordance with a second exemplary embodiment of the present invention, the number of slits in the first group of slits 311 is the same as that of slits in the second group of slits 312. More specifically, the first group of slits 311 includes two first slits 3111 arranged in a first direction, and the second group of slits 312 includes two slits 3112 arranged in a second direction.

Figure 7:
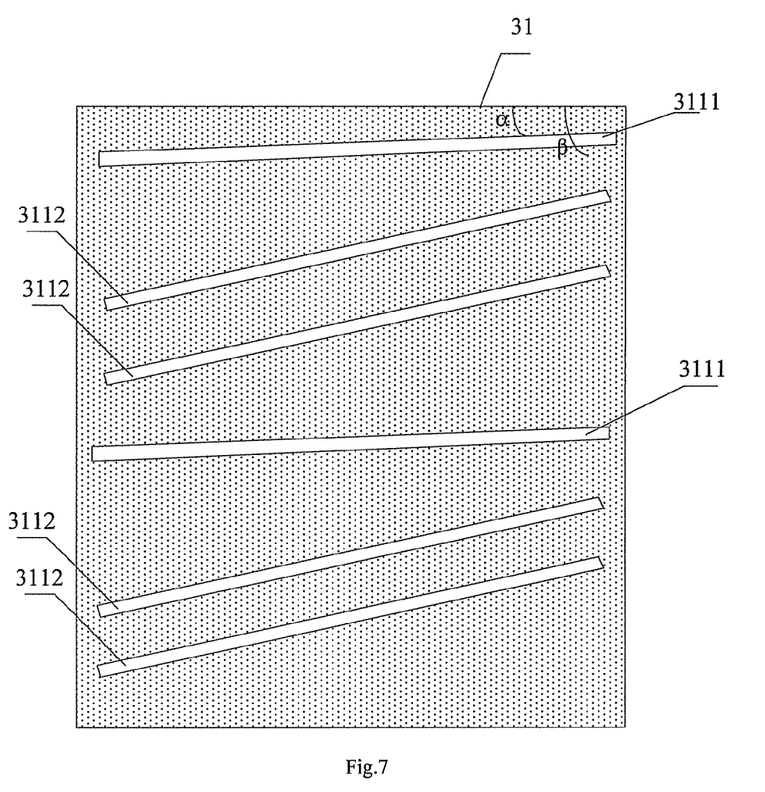
FIG. 7 is a structure diagram showing a slit electrode unit in which a first slit group includes one slit and a second slit group include two slits according to a third exemplary embodiment.

In a slit electrode unit 31 shown in FIG. 7 in accordance with a third exemplary embodiment of the present invention, the number of slits in the first group of slits 311 is different from that of slits in the second group of slits 312. More specifically, the first group of slits 311 includes one first slit 3111 arranged in a first direction, and the second group of slits 312 includes two slits 3112 arranged in a second direction.

In a further exemplary embodiment, in the slit electrodes, the first group of slits 311 may include two first slits 3111 arranged in the first direction, and the second group of slits 312 my include one slit 3112 arranged in the second direction.

All of the first and second groups of slits 311 and 312 in the slit electrode unit 31 are arranged along the short side or the long side of the pixel electrodes 3. The first and second groups of slits of the slit electrode unit 31 of the present embodiment shown in FIGS. 5 to 10 are arranged along the short side of the pixel electrodes 3.

Figure 8:
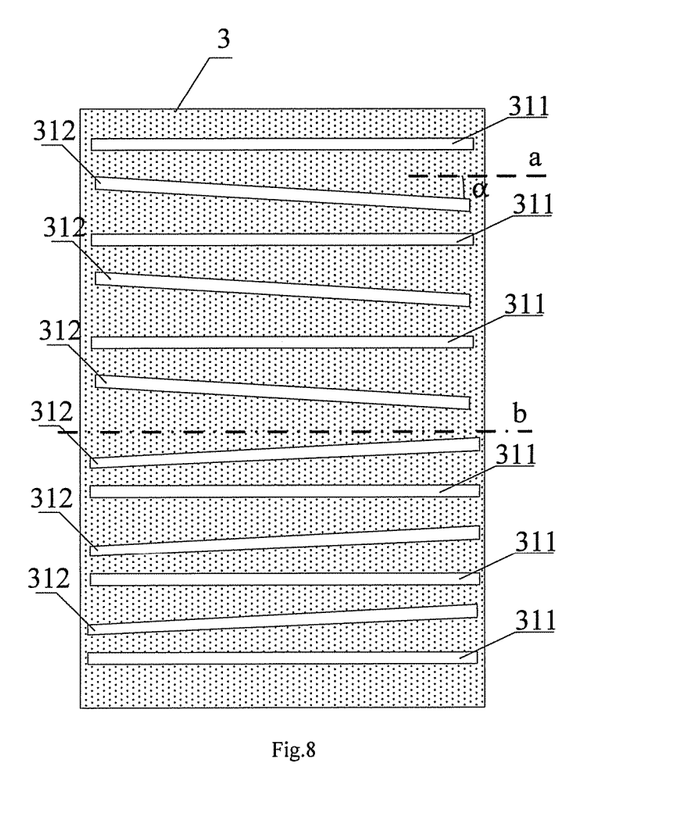
FIG. 8 is a structure diagram showing a slit electrode unit in which a first slit group and a second slit group both include one slit according to a fourth exemplary embodiment.

The pixel electrodes of a fourth exemplary embodiment of the present invention may have a structure shown in FIG. 8. First slit groups 311 are parallel with the short side of the pixel electrodes (indicated by a broken line "a" of FIG. 8), and an angle α is defined by second slit groups 312 and the short side of the pixel electrodes.

The principle that the brightness uniformity and the color shift of the image can be improved by the array substrate of the slit electrodes shown in FIG. 5 in accordance with the first exemplary embodiment is described with reference to FIG. 9.

In the case of a display screen of ADS mode, a voltage difference is generated between the pixel electrodes and the common electrodes when a predetermined voltage is applied, and an electrical field is generated thereof. In the prior art, the image brightness in a corresponding region to each pixel electrode is uneven on the same gray scale, and this defect may be visual in the gray scale image under a low voltage, and may not be visual in the case where the display screen is completely black or the whole display screen is highly bright. Thus, the darker a gray scale display effect is under the low voltage, the less apparent uniformity defects in the image brightness are. Therefore, it is desired to ensure that a light transmittance is low under the low voltage, thereby obtaining a more uniform brightness of the image display.

Figure 9:
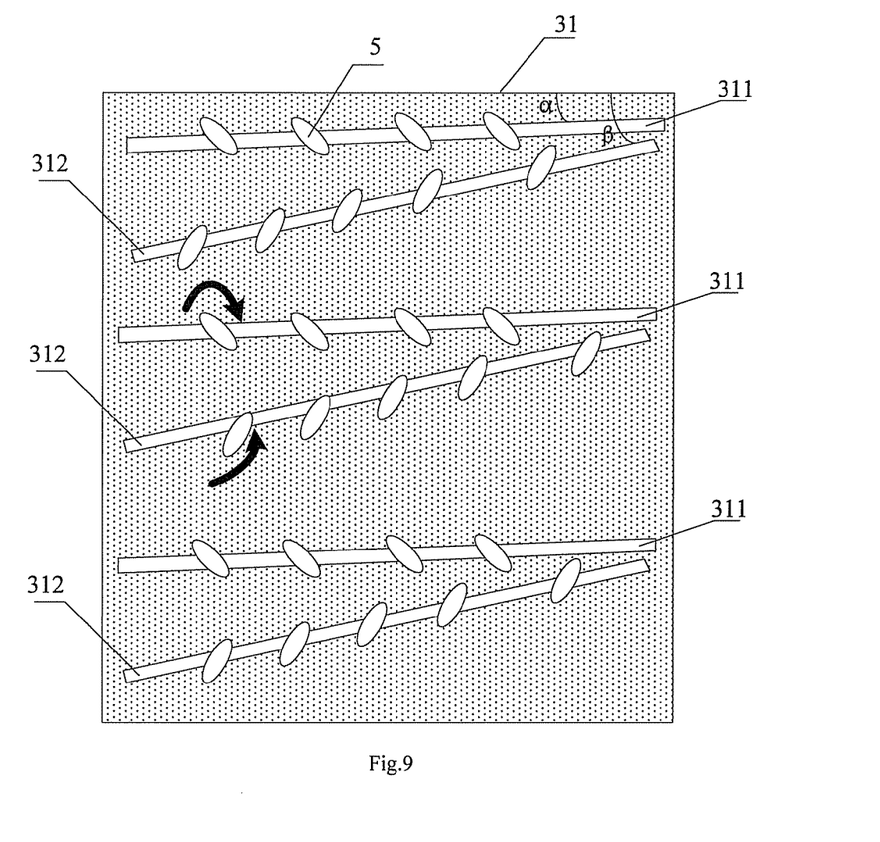
FIG. 9 is a schematic diagram showing arrangement mode of liquid crystal molecules under the action of the common electrode and the slit electrode in the case of the slit electrode unit shown in FIG. 5.

FIG. 9 is a schematic diagram showing an arrangement mode of liquid crystal molecules 5 after an electrical field is generated between the slit electrodes 31 and common electrode (not shown in FIG. 9) applied with a predetermined driving voltage in the case of the slit electrode unit shown in FIG. 5. At this time, the liquid crystal molecules is changed from an uniform arrangement orientation, in the case where the slit electrode unit 31 is not applied with a voltage, to arrangement orientations, in the case where the slit electrode unit 31 and the common electrode are applied with the driving voltage, which are affected by the slit electrode unit 31. Two arrangement orientations are formed in the slits of the slit electrode unit 31. Electrical fields generated between portions of the slit electrode unit 31 except for the slits 31 are not uniform locally, and directing directions of the electrical fields are different in the horizontal direction.

Major axes of the liquid crystal molecules 5 are arranged in the direction of the electric field line, so the orientations of the liquid crystal molecules 5 are not uniform locally, and directing directions of the major axes of the liquid crystal molecules 5 are different in the horizontal direction as well. Therefore, under the low voltage, the light transmittance is low, which may ensure a uniform brightness of the display image.

Further, when the directing directions of the major axes of the liquid crystal molecules 5 are not the same in the horizontal direction, refractive indexes of the liquid crystal molecules 5 are different at a certain visual angle, thus differences in average refractive indexes of the liquid crystal molecules at different visual angles are reduced as a whole. When viewing the display screen at different angle, the display images on the display screen have no too apparent differences. When viewing the display screen at a relative large visual angle, the changes in the chromatic deviation and the brightness are small, thus improving the uniformity of the image brightness, reducing the chromatic aberration when viewed at different visual angles, and improve the quality of the image display.

It should be understood that the angle formed by the slits and the short side of the pixel electrodes, the width of the slits and the density of the slits depend on the specific size of the display screen.

In an exemplary embodiment, the sum (α+β) of the angle α formed by the first slits in the first group of slits and the short side of the pixel electrodes and the angle β formed by the second slits in the second group of slits and the short side of the pixel electrodes is in a range of 0°-20°.

For example, the angle α may be ±11°, and the angle point β may be ±7°. The angle point β may be ±11°, and the angle α may be ±7°. The angle α may be 0°, and the angle point β may be ±7° or ±11°. Alternatively, the angle β may be 0°, and the angle α may be ±7° or ±11°.

In an exemplary embodiment, the average distance between two adjacent slits in the first and second groups of slits is in a range of 1 μm-40 μm.

It should be understood that on the one hand the angle formed by the slits and the horizontal direction and the average distance between the two adjacent slits may be set relatively large when the size of the display screen is large. On the other hand, the angle formed by the slits and the horizontal direction and the average distance between the two adjacent slits may be set relatively small when the size of the display screen is small.

In an exemplary embodiment, the slit electrode comprises two slit electrode units, first and second slits of which are arranged in a mirror symmetrical manner respectively.

Figure 10:
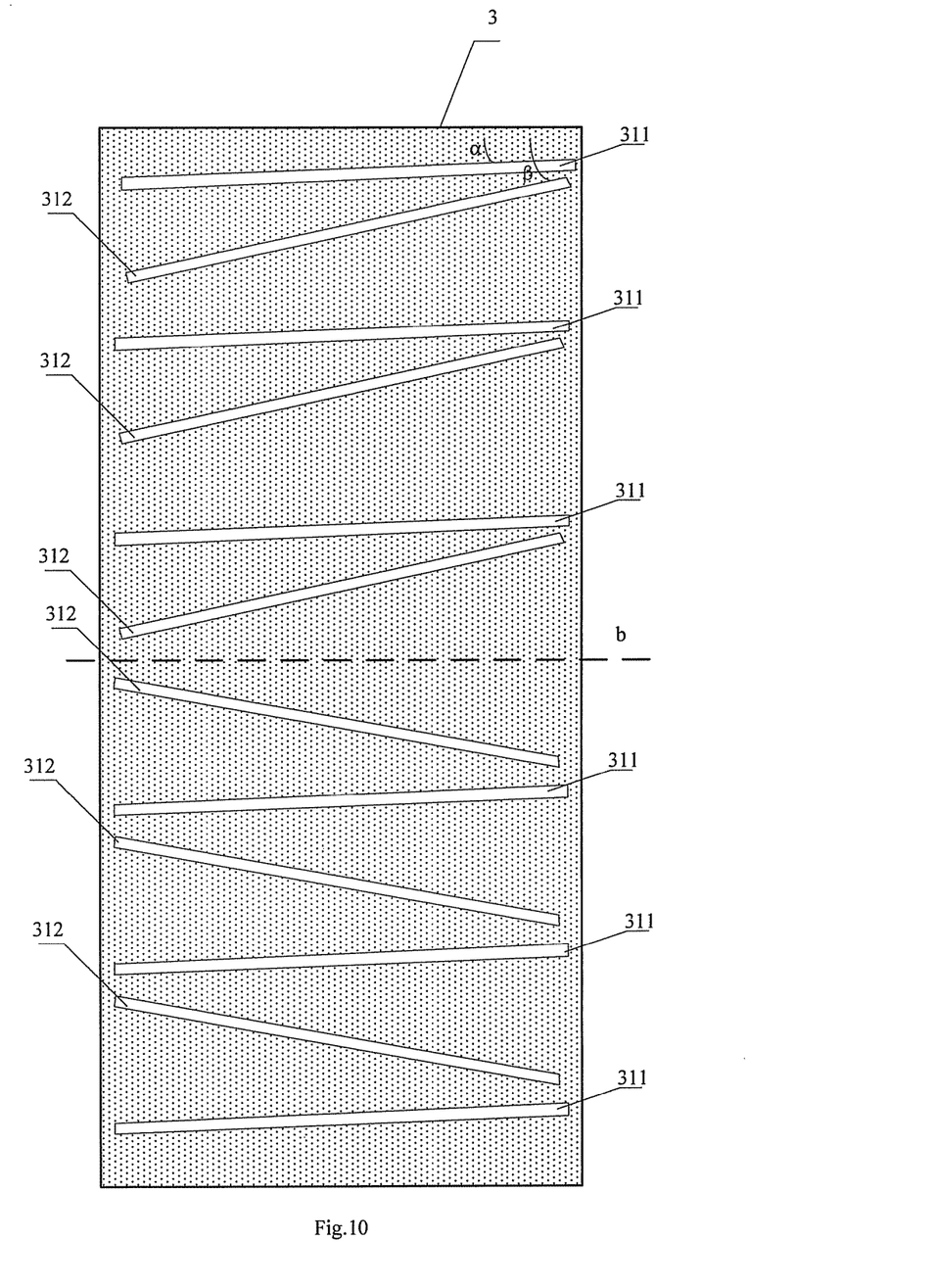
FIG. 10 is a structure diagram showing a slit electrode structure including two slit electrode units according to a fifth exemplary embodiment.

FIG. 10 is a schematic top view of a pixel electrode 3 comprising two slit electrode units shown in FIG. 5 in accordance with a fifth embodiment of the present invention, wherein a portion above a broken line "b" is a first slit electrode unit, and a portion below the broken line "b" is a second slit electrode unit. The first and second electrode units are disposed to be mirror symmetrical about the broken line "b".

It should be appreciated that the remaining portion on the pixel electrode 3 besides the first and second slit groups is a conductive film layer portion of the pixel electrode.

The slit electrode units having mirror symmetrical arrangement may further improve the uneven distribution of liquid crystal molecules, reduce the light transmittance under the low voltage, and decrease the color shift at different viewing angle.

It should be noted that the embodiment of the slit electrode is not limited to those shown in FIG. 5 through FIG. 10.

When the size of the display screen is large, such as tablet computer or LCD TV, the number of the slits in the first and second slit groups may be set relatively large because the respective pixel electrodes are relatively large. However, when the size of the display screen is small, in order to reduce the complexity of the manufacturing process, the number of the slits of the first and second slit groups may be set to be relatively small.

In an exemplary embodiment, the number of the slits in the first group of slits may be the same as that in the second group of slits to ensure the liquid crystal molecules are arranged uniformly on the whole pixel electrodes, thus achieving a better display effect.

In an alternative exemplary embodiment, the common electrode may be provided as the slit electrode, and the slits are arranged at the position corresponding to a display region. The arrangement mode of the slits in the common electrode is the same as that in the pixel electrode as described above are arranged, and the detailed description thereof are omitted herein.

The slit electrode according to an alternative embodiment of the present embodiment, the slits may be arranged in a direction parallel to the long side of the pixel electrode.

It should be noted that the pixel electrode is provided as a plate-like electrode when the common electrode is provided as a slit electrode, and the common electrode is provided as a plate-like electrode when the pixel electrode is provided as a slit electrode. In this way, it is possible to ensure the liquid crystal molecules to be deflected in a dense electrical field, thus achieving a better display effect.

An embodiment of a further aspect of the present invention further provides an array substrate comprising the slit electrode described in above various embodiment of the present invention.

An embodiment of a still further aspect of the present invention further provides a display device comprising the array substrate described above. The display device may comprise a liquid crystal panel of ADS-mode, a liquid crystal display, a liquid crystal display of TV, an organic light emitting display (OLED) panel, an OLED display, an OLED television, electronic paper or the like.

An example of the display device comprises a liquid crystal display device in which an array substrate is coupled with an opposed substrate to form a liquid crystal layer into which liquid crystal material is filled. The opposed substrate is provided as, for example, a color film substrate. Pixel electrodes of each pixel unit of the array substrate are used to apply an electrical field to control the revolution degree of the liquid crystal material so as to perform a display operation. In some embodiments, the liquid crystal display device further comprises a backlight source for provide backlights to the array substrate.

Another example of the display device comprises an organic light emitting display (OLED) device in which a thin film transistor of each pixel unit of an array substrate is connected with an anode or a cathode of the organic light emitting display device for driving an organic light emitting material to perform a display operation.

A slit electrode in accordance with an embodiment of the invention comprises at least one slit electrode unit, wherein the slit electrode unit including a plurality of first groups of slits arranged in a first direction and a plurality of second groups of slits arranged in a second direction different from the first direction, wherein the first group of slits includes at least one first slit arranged in the first direction, and the second group of slits includes at least one second slit arranged in the second direction, and wherein the first and the second groups of slits are arranged alternately. Since the directions of the first and second slits are arranged different from each other, shapes of the slit electrodes are different accordingly, and directions of local electrical fields generated between the slit electrode and corresponding electrode are different, so that orientations of the liquid crystal molecules around the adjacent slits are different with respect to the horizontal direction when being applied with the voltage, thereby causing the image brightness to become uniform as a whole. In addition, due to inherent characteristics of the liquid crystal molecules, the image in the major axis direction of the liquid crystal molecules is blue, and the image in the minor axis direction of the liquid crystal molecules is red. Since the orientations of the liquid crystal molecules arranged around the adjacent slits are different with respect to the horizontal direction, it is possible to balance different image colors in the major and minor axes directions of the liquid crystal molecules, thus reducing the color shift.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An array substrate having advanced super dimension switch (ADS) mode comprising:
   a substrate; and
   a common electrode and a pixel electrode arranged on the substrate and insulated by an insulating layer with each other,
   wherein one of the common electrode and the pixel electrode is provided as a slit electrode comprising first and second slit electrode units, each including a plurality of first groups of slits arranged in a first direction, and a plurality of second groups of slits arranged in a second direction, and
   wherein each of the first groups of slits of the first slit electrode unit includes at least one first slit arranged in the first direction, each of the second groups of slits of the first slit electrode unit includes at least one second slit arranged in the second direction, and wherein the first and the second groups of slits of the first slit electrode unit are both arranged alternately in one column, and
   wherein the first and second groups of slits of the first slit electrode unit are arranged in a repeating pattern of a pair and are mirror symmetrical with the first and second groups of slits of the second slit electrode unit corresponding to a center line dividing the first and second slit electrode units, and
   wherein an angle $\alpha$ is defined by the first direction of the first groups of slits of the first slit electrode unit and a short side of the slit electrode, and wherein an angle $\beta$ is defined by the second direction of the second groups of slits of the first slit electrode unit and the short side of the slit electrode, and
   wherein the angle $\alpha$ is about $\pm 11°$ and the angle $\beta$ is about $\pm 7°$, or the angle $\beta$ is about $\pm 11°$ and the angle $\alpha$ is about $\pm 7°$.

2. The array substrate as claimed in claim 1, wherein each of the first groups of slits comprises one or two first slits; and each of the second groups of slits comprises one or two second slits.

3. The array substrate as claimed in claim 1, wherein an average distance between two adjacent slits in the first and second slits is in a range of 1 μm-40 μm.

4. A display device comprising the array substrate according to claim 1.

5. The display device as claimed in claim 4, wherein each of the first groups of slits comprises one or two first slits; and each of the second groups of slits comprises one or two second slits.

6. The display device as claimed in claim 4, wherein an average distance between two adjacent slits in the first and second slits is in a range of 1 μm-40 μm.

* * * * *